US010479913B2

(12) United States Patent
Han et al.

(10) Patent No.: US 10,479,913 B2
(45) Date of Patent: Nov. 19, 2019

(54) SILICONE COMPOSITION AND A PRESSURE SENSITIVE ADHESIVE FILM HAVING A PRESSURE SENSITIVE ADHESIVE LAYER MADE FROM THE COMPOSITION

(71) Applicant: Dow Corning Corporation, Midland, MI (US)

(72) Inventors: Kyungdong Han, Chungju-si (KR); Gunn Jo, Chungju-si (KR); Bokyung Kim, Anseong-si (KR)

(73) Assignee: Dow Silicones Corporation, Midland, MI (US)

( * ) Notice: Subject to any disclaimer, the term of this patent is extended or adjusted under 35 U.S.C. 154(b) by 168 days.

(21) Appl. No.: 15/518,660

(22) PCT Filed: Sep. 28, 2015

(86) PCT No.: PCT/US2015/052578
§ 371 (c)(1),
(2) Date: Apr. 12, 2017

(87) PCT Pub. No.: WO2016/060831
PCT Pub. Date: Apr. 21, 2016

(65) Prior Publication Data
US 2017/0233612 A1    Aug. 17, 2017

Related U.S. Application Data

(60) Provisional application No. 62/064,558, filed on Oct. 16, 2014.

(51) Int. Cl.
*C09J 7/38* (2018.01)
*C08K 3/36* (2006.01)
*C09J 183/14* (2006.01)

(52) U.S. Cl.
CPC .................. *C09J 7/38* (2018.01); *C08K 3/36* (2013.01); *C09J 183/14* (2013.01); *C09J 2201/606* (2013.01); *C09J 2400/10* (2013.01); *C09J 2467/006* (2013.01); *C09J 2483/00* (2013.01)

(58) Field of Classification Search
None
See application file for complete search history.

(56) References Cited

U.S. PATENT DOCUMENTS

| | | | | |
|---|---|---|---|---|
| 5,977,220 A * | 11/1999 | Burkus, II | ............... | C08K 5/19 524/104 |
| 5,998,515 A * | 12/1999 | Burkus, II | ............... | C08K 5/19 524/104 |
| 5,998,516 A * | 12/1999 | Burkus, II | ............... | C08K 5/19 524/104 |
| 6,548,568 B1 * | 4/2003 | Pinto | ..................... | C08F 283/12 427/207.1 |
| 8,057,909 B2 | 11/2011 | Aoki et al. | | |
| 2003/0064232 A1 * | 4/2003 | Allen | ..................... | C08G 77/20 428/447 |
| 2003/0166777 A1 * | 9/2003 | Vachon | ................... | C08L 83/04 525/100 |
| 2004/0192874 A1 * | 9/2004 | Walker | ................... | C08G 77/50 528/32 |
| 2006/0128881 A1 * | 6/2006 | George | ................. | C08K 5/526 524/588 |
| 2008/0276983 A1 * | 11/2008 | Drake | ..................... | C08L 83/14 136/251 |
| 2009/0114342 A1 * | 5/2009 | Aoki | ..................... | C09J 183/04 156/329 |
| 2012/0045635 A1 * | 2/2012 | Aoki | ..................... | C09J 183/04 428/220 |

(Continued)

FOREIGN PATENT DOCUMENTS

| | | |
|---|---|---|
| EP | 0636662 A2 | 2/1995 |
| JP | 2004231900 A | 8/2004 |
| JP | 2004231900 A | 8/2004 |

(Continued)

OTHER PUBLICATIONS

PCT/US2015/052578 International Search Report dated Dec. 31, 2015, 3 pages.
English language abstract and machine translation for JP2004231900 (A) extracted from http://worldwide.espacenet.com database on Apr. 12, 2017, 21 pages.
English language abstract and machine translation for WO2014119930 (A1) extracted from Google Patents on Jul. 31, 2018, 11 pages.

*Primary Examiner* — Peter A Salamon
(74) *Attorney, Agent, or Firm* — Warner Norcross + Judd LLP

(57) ABSTRACT

A pressure sensitive adhesive film comprises a substrate film and a pressure sensitive adhesive (PSA) layer formed on a surface of the substrate film. The PSA layer is formed from a silicone composition comprising: a diorganopolysiloxane having at least two alkenyl groups in a molecule and having a viscosity at 25° C. of from 10,000 to 1,000,000 mPa·s; (B) a diorganopolysiloxane having at least one alkenyl group in a molecule, and being raw and rubber-like at 25° C. or having a viscosity at 25° C. of more than 1,000,000 mPa·s; (C) an organopolysiloxane resin represented by the following average unit formula: $(R^1_3SiO_{1/2})_x(SiO_{4/2})_{1.0}$, wherein each $R^1$ represents a halogen-substituted or unsubstituted monovalent hydrocarbon group free from an alkenyl group and x is a number from 0.5 to 1.0; (D) an organohydrogenpolysiloxane having at least two silicon-bonded hydrogen atoms in a molecule; (E) silica fine powder; and (F) a hydrosilylation catalyst.

16 Claims, No Drawings

(56) References Cited

U.S. PATENT DOCUMENTS

2012/0245272 A1* 9/2012 Dent .................. C08G 77/50
  524/502
2017/0327713 A1* 11/2017 Steinmann .......... C09D 183/04

FOREIGN PATENT DOCUMENTS

| WO | WO2014069610 A1 | 5/2014 |
| WO | WO2014081044 A2 | 5/2014 |
| WO | WO2014119930 A1 | 8/2014 |

* cited by examiner

SILICONE COMPOSITION AND A PRESSURE SENSITIVE ADHESIVE FILM HAVING A PRESSURE SENSITIVE ADHESIVE LAYER MADE FROM THE COMPOSITION

CROSS-REFERENCE TO RELATED APPLICATIONS

This application is the National Stage of International Application No. PCT/US2015/052578 filed on 28 Sep. 2015, which claims the benefit of U.S. Provisional Patent Application No. 62/064,558 filed on 16 Oct. 2014, the content of which is hereby incorporated by reference.

TECHNICAL FIELD

This invention relates to a silicone composition that can be formed a pressure sensitive adhesive layer on a substrate. This invention also relates to a pressure sensitive adhesive film having a pressure sensitive adhesive layer made from the composition.

BACKGROUND ART

Silicone pressure sensitive adhesives have excellent heat resistance, freeze resistance and electrical properties inherent to silicone and maintain adhesion without impairing these properties. They are thus widely used as pressure sensitive adhesives where a high level of reliability is required. Typical silicone pressure sensitive adhesive compositions comprise: a diorganopolysiloxane having at least two alkenyl groups in a molecule; an organopolysiloxane containing of $R_3SiO_{1/2}$ units and $SiO_{4/2}$ units in a molar ratio of the $R_3SiO_{1/2}$ unit to the $SiO_{4/2}$ unit of from 0.6 to 1.7, wherein R is a monovalent hydrocarbon group having 1 to 10 carbon atoms; an oragnopolysiloxane having at least two silicon-bonded hydrogen atoms in a molecule; an inhibitor, hydrosilylation catalyst; and a solvent (see U.S. Pat. No. 8,057,909 B2).

Recently, the silicone pressure sensitive adhesive compositions may be applied to micro gravure coatings in order to obtain a thin pressure sensitive adhesive layer on a substrate film. However, the aforementioned silicone pressure sensitive adhesive compositions cannot form the pressure sensitive adhesive layer exhibiting proper adhesion and good anti-scratch property on the substrate film.

SUMMARY OF INVENTION

Technical Problem

An object of the present invention is to provide a silicone composition that exhibits proper viscosity and can form a pressure sensitive adhesive layer exhibits proper adhesion and good anti-scratch property on a substrate film. Another object of the present invention is to provide a pressure sensitive adhesive film whose pressure sensitive adhesive layer exhibits proper adhesion and good anti-scratch property.

Solution to Problem

The silicone composition of the present invention comprises:
(A) a diorganopolysiloxane having at least two alkenyl groups in a molecule and having a viscosity at 25° C. of from 10,000 to 1,000,000 mPa·s, in an amount of from 60 to 80 mass based on a mass of the composition;
(B) a diorganopolysiloxane having at least one alkenyl group in a molecule, and being a raw rubber-like at 25° C. or having a viscosity at 25° C. of more than 1,000,000 mPa·s, in an amount of more than 0 mass %, but not more than 10 mass % based on a mass of the composition;
(C) an organopolysiloxane resin represented by the following average unit formula:

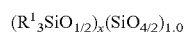

wherein each $R^1$ represents a halogen-substituted or unsubstituted monovalent hydrocarbon group free from an alkenyl group and x is a number from 0.5 to 1.0, in an amount of from 0.5 to 20 mass % based on a mass of the composition;
(D) an organohydrogenpolysiloxane having at least two silicon-bonded hydrogen atoms in a molecule, in a quantity that provides from 0.1 to 10 moles of the silicon-bonded hydrogen atoms in this component per 1 mole of the total alkenyl groups in the composition;
(E) silica fine powder in an amount of from 0.5 to 5 mass % based on a mass of the composition; and
(F) a hydrosilylation catalyst in a quantity that accelerates hydrosilylation of the composition.

The pressure sensitive adhesive film of the present invention comprises: a substrate film and a pressure sensitive adhesive layer on a surface of the substrate film, said pressure sensitive adhesive layer being made from a silicone composition comprising:
(A) a diorganopolysiloxane having at least two alkenyl groups in a molecule and having a viscosity at 25° C. of from 10,000 to 1,000,000 mPa·s, in an amount of from 60 to 80 mass based on a mass of the composition;
(B) a diorganopolysiloxane having at least one alkenyl group in a molecule, and being a raw rubber-like at 25° C. or having a viscosity at 25° C. of more than 1,000,000 mPa·s, in an amount of more than 0 mass %, but not more than 10 mass % based on a mass of the composition;
(C) an organopolysiloxane resin represented by the following average unit formula:

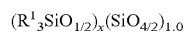

Wherein each $R^1$ represents a halogen-substituted or unsubstituted monovalent hydrocarbon group free from an alkenyl group and x is a number from 0.5 to 1.0, in an amount of from 0.5 to 20 mass % based on a mass of the composition;
(D) an organohydrogenpolysiloxane having at least two silicon-bonded hydrogen atoms in a molecule, in a quantity that provides from 0.1 to 10 moles of the silicon-bonded hydrogen atoms in this component per 1 mole of the total alkenyl groups in the composition;
(E) silica fine powder in an amount of from 0.5 to 5 mass % based on a mass of the composition; and
(F) a hydrosilylation catalyst in a quantity that accelerates hydrosilylation of the composition.

Effect of Invention

The silicone composition of the present invention exhibits proper viscosity and can form a pressure sensitive adhesive layer exhibits proper adhesion and good anti-scratch property on a substrate film. Furthermore, the pressure sensitive adhesive film of the present invention has a pressure sensitive adhesive layer exhibiting proper adhesion and good anti-scratch property.

DETAILED DESCRIPTION OF THE INVENTION

First, the silicone composition of the present invention will be explained in detail.

Component (A) is a diorganopolysiloxane having at least two alkenyl groups in a molecule. The alkenyl groups in component (A) can be exemplified by vinyl, allyl, butenyl, pentenyl, hexenyl, and heptenyl groups and are preferably vinyl groups. The non-alkenyl Si-bonded organic groups in component (A) can be exemplified by alkyl groups such as methyl, ethyl, propyl, butyl, pentyl, and hexyl groups; aryl groups such as phenyl, tolyl, and xylyl groups; aralkyl groups such as benzyl and phenethyl groups; and halogenated alkyl groups such as 3-chloropropyl and 3,3,3-trifluoropropyl groups, and are preferably methyl and phenyl groups. Although the molecular structure of component (A) is straight chain substantially, a part of the molecular chain may branch. The viscosity of component (A) at 25° C. measured by a rotational viscometer is from 10,000 to 1,000,000 mPa·s and preferably is from 10,000 to 500,000 mPa·s, or from 10,000 to 100,000 mPa·s.

Component (A) can be exemplified by dimethylvinylsiloxy-endblocked dimethylpolysiloxanes; dimethylvinylsiloxy-endblocked dimethylsiloxane-methylvinylsiloxane copolymers; trimethylsiloxy-endblocked dimethylsiloxane-methylvinylsiloxane copolymers; partially branched-chain dimethylpolysiloxane with molecular chain ends terminated by dimethylvinylsiloxy and trimethylsiloxy; trimethylsiloxy-endblocked partially branched-chain dimethylsiloxane-methylvinylsiloxane copolymers; the diorganopolysiloxanes afforded by replacing all or part of the methyl in the preceding diorganopolysiloxanes with alkyl such as ethyl or propyl, aryl such as phenyl or tolyl, or halogenated alkyl such as 3,3,3-trifluoropropyl; the diorganopolysiloxanes afforded by replacing all or part of the vinyl in the preceding diorganopolysiloxanes with alkenyl such as allyl or propenyl; and mixtures of two or more of the preceding diorganopolysiloxanes.

Component (A) is used in an amount of from 60 to 80 mass % based on a mass of the composition, preferably from 65 to 80 mass % based on a mass of the composition. This is because when the content of component (A) is greater than or equal to the lower limit of the range described above, the composition exhibits proper viscosity for a micro-gravure coating, and when the content is less than or equal to the upper limit of the range described above, the composition forms a pressure sensitive adhesive layer exhibiting proper adhesion and good anti-scratch property on a substrate film.

Component (B) is another diorganopolysiloxane having at least one alkenyl group in a molecule. The alkenyl groups in component (B) can be exemplified by vinyl, allyl, butenyl, pentenyl, hexenyl, and heptenyl groups and are preferably vinyl groups. The non-alkenyl Si-bonded organic groups in component (B) can be exemplified by alkyl groups such as methyl, ethyl, propyl, butyl, pentyl, and hexyl groups; aryl groups such as phenyl, tolyl, and xylyl groups; aralkyl groups such as benzyl and phenethyl groups; and halogenated alkyl groups such as 3-chloropropyl and 3,3,3-trifluoropropyl groups, and are preferably methyl and phenyl groups. Although the molecular structure of component (B) is straight chain substantially, a part of the molecular chain may branch. Component (B) is a raw rubber-like at 25° C., or even if it a liquid at 25° C., it has a viscosity at 25° C. measured by a rotational viscometer of more than 1,000,000 mPa·s. It is preferably a raw rubber-like at 25° C.

Component (B) can be exemplified by dimethylvinylsiloxy-endblocked dimethylpolysiloxanes; dimethylvinylsiloxy-endblocked dimethylsiloxane-methylvinylsiloxane copolymers; trimethylsiloxy-endblocked dimethylsiloxane-methylvinylsiloxane copolymers; partially branched-chain dimethylpolysiloxane with molecular chain ends terminated by dimethylvinylsiloxy and trimethylsiloxy; trimethylsiloxy-endblocked partially branched-chain dimethylsiloxane-methylvinylsiloxane copolymers; the diorganopolysiloxanes afforded by replacing all or part of the methyl in the preceding diorganopolysiloxanes with alkyl such as ethyl or propyl, aryl such as phenyl or tolyl, or halogenated alkyl such as 3,3,3-trifluoropropyl; the diorganopolysiloxanes afforded by replacing all or part of the vinyl in the preceding diorganopolysiloxanes with alkenyl such as allyl or propenyl; and mixtures of two or more of the preceding diorganopolysiloxanes.

Component (B) is used in an amount of from more than 0 mass %, but not more than 10 mass % based on a mass of the composition, preferably from 1 to 10 mass % based on a mass of the composition. This is because when the content of component (B) is greater than or equal to the lower limit of the range described above, the composition exhibits proper viscosity for a micro-gravure coating, and when the content is less than or equal to the upper limit of the range described above, the composition forms a pressure sensitive adhesive layer having smooth surface on a substrate film.

Component (C) is an organopolysiloxane resin represented by the following average unit formula:

$$(R^1{}_3SiO_{1/2})_x(SiO_{4/2})_{1.0}$$

Wherein each $R^1$ represents a halogen-substituted or unsubstituted monovalent hydrocarbon group free from an alkenyl group, and can be exemplified by alkyl groups such as methyl, ethyl, propyl, butyl, pentyl, and hexyl groups; aryl groups such as phenyl, tolyl, and xylyl groups; aralkyl groups such as benzyl and phenethyl groups; and halogenated alkyl groups such as 3-chloropropyl and 3,3,3-trifluoropropyl groups. $R^1$ is preferably a methyl and phenyl group.

Wherein x is a number from 0.5 to 1.0, and preferably from 0.5 to 0.9. This is because when the number of x is greater than or equal to the lower limit of the range described above, the composition exhibits proper viscosity for a micro-gravure coating, and when the number of x is less than or equal to the upper limit of the range described above, the composition forms a pressure sensitive adhesive layer exhibiting proper adhesion and good anti-scratch property on a substrate film.

Component (C) is used in an amount of from 0.5 to 20 mass % based on a mass of the composition, preferably from 1 to 20 mass % based on a mass of the composition. This is because when the content of component (C) is greater than or equal to the lower limit of the range described above, the composition forms a pressure sensitive adhesive layer exhibiting proper adhesion on a substrate film, and when the content is less than or equal to the upper limit of the range described above, the composition exhibits proper viscosity for a micro-gravure coating.

Component (D) is an organohydrogenpolysiloxane having at least two silicon-bonded hydrogen atoms in a molecule. The Si-bonded organic groups in component (D) can be exemplified by alkyl groups such as methyl, ethyl, propyl, butyl, pentyl, and hexyl groups; aryl groups such as phenyl, tolyl, and xylyl; aralkyl groups such as benzyl and phenethyl groups; and halogenated alkyl groups such as 3-chloropropyl and 3,3,3-trifluoropropyl groups. Methyl groups are preferred for the Si-bonded organic groups in component (D). The molecular structure of component (D) can be, for example, straight chain, branched chain, partially branched straight chain, network, or dendritic. The viscosity of component (D) at 25° C. is not critical, but is preferably from 1 to 1,000,000 mPa·s and more preferably is from 1 to 10,000 mPa·s.

Component (D) can be exemplified by trimethylsiloxy-endblocked methylhydrogenpolysiloxanes; trimethylsiloxy-endblocked dimethylsiloxane-methylhydrogensiloxane copolymers; dimethylhydrogensiloxy-endblocked methylhydrogenpolysiloxanes; dimethylhydrogensiloxy-endblocked dimethylsiloxane-methylhydrogensiloxane copolymers; dimethylhydrogensiloxy-endblocked dimethylpolysiloxanes; cyclic methylhydrogenpolysiloxanes; organopolysiloxanes comprising the siloxane unit represented by the formula $(CH_3)_2HSiO_{1/2}$ and the siloxane unit represented by the formula $SiO_{4/2}$; the organopolysiloxanes afforded by replacing all or part of the methyl in the preceding organopolysiloxanes with alkyl such as ethyl or propyl, aryl such as phenyl or tolyl, or halogenated alkyl such as 3,3,3-trifluoropropyl; and mixtures of two or more of the preceding organopolysiloxanes.

Component (D) is used in the composition under consideration in a quantity that affords 0.1 to 10 moles, preferably 0.1 to 5 moles, and particularly preferably 0.1 to 3 moles silicon-bonded hydrogen atoms from component (D) per 1 mole of the total alkenyl groups in the composition. This is because when the content of component (D) is greater than or equal to the lower limit of the range described above, the composition forms a pressure sensitive adhesive layer exhibiting good mechanical property on a substrate film, and when the content is less than or equal to the upper limit of the range described above, the composition forms a pressure sensitive adhesive layer exhibiting proper adhesion on a substrate film.

Component (E) is silica fine powder for increasing antiscratch property of obtained pressure sensitive adhesions. Component (E) can be exemplified by fumed silica, precipitated silica, calcined silica, or powder as afforded by treating the surface of these silica powders with an organosilicon compound such as an organoalkoxysilane, organohalosilane, or organosilazane. The use of silica powder with a BET specific surface area of at least 50 m$^2$/g is preferred in particular in order to generate a satisfactory anti-scratch property of the obtained silicone pressure sensitive adhesion.

Component (E) is used in an amount of from 0.5 to 5 mass % based on a mass of the composition, preferably from 0.5 to 3 mass based on a mass of the composition. This is because when the content of component (E) is greater than or equal to the lower limit of the range described above, the composition forms a pressure sensitive adhesive layer exhibiting good anti-scratch property on a substrate film, and when the content is less than or equal to the upper limit of the range described above, the composition forms a pressure sensitive adhesive layer exhibiting proper adhesion on a substrate film.

Component (F) is a hydrosilylation catalyst that accelerates the cure of the composition under consideration and can be exemplified by platinum catalysts, rhodium catalysts, and palladium catalysts wherein platinum catalysts are preferred. These platinum catalysts can be exemplified by finely divided platinum powder, platinum black, chloroplatinic acid, platinum tetrachloride, alcohol solutions of chloroplatinic acid, olefin complexes of platinum, alkenylsiloxane complexes of platinum, and carbonyl complexes of platinum.

Component (F) is used in the composition under consideration in an amount that accelerates cure of the composition, but its content is not otherwise critical. When, for example, a platinum catalyst is used as component (F), the content of this component preferably provides 0.01 to 500 parts by mass of platinum metal from component (F) per 1,000,000 parts by mass of the composition and more preferably 0.1 to 100 parts by mass of platinum metal from component (F) per 1,000,000 parts by mass of the composition.

The silicone composition of the present invention may contain (G) an anchorage additive in order to improve its adherence to a substrate film. Component (G) can be exemplified by silane coupling agents such as methyltrimethoxysilane, vinyltrimethoxysilane, allyltrimethoxysilane, 3-methacryloxypropyltrimethoxysilane, 3-glycidoxypropyltrimethoxysilane, 3-am inopropyltrimethoxysilane, N-(2-aminoethyl)-3-aminopropyltrimethoxysilane, bis(trimethoxysilyl)propane, and bis(trimethoxysilyl)hexane; mixtures or reaction mixtures of said silane coupling agents and siloxane compounds having at least one silicon-bonded hydroxy group and a silicon-bonded alkenyl group.

The content of component (G) is not critical, but is preferably in the range of 0.1 to 5 mass % based on a mass of the composition, preferably from 0.1 to 3 mass % based on a mass of the composition. This is because when the content of component (G) is greater than or equal to the lower limit of the range described above, the composition may form a pressure sensitive adhesive layer exhibiting good adhesion to a substrate film, and when the content is less than or equal to the upper limit of the range described above, the composition forms a pressure sensitive adhesive layer exhibiting proper adhesion on a substrate film.

The silicone composition of the present invention may contain (H) a reaction inhibitor in order to improve its storage stability and handling characteristics. Component (H) can be exemplified by acetylenic compounds such as 2-methyl-3-butyn-2-ol, 3,5-dimethyl-1-hexyn-3-ol, and 2-phenyl-3-butyn-2-ol; ene-yne compounds such as 3-methyl-3-penten-1-yne and 3,5-dimethyl-3-hexen-1-yne; organosiloxane compounds such as 1,3,5,7-tetramethyl-1,3,5,7-tetravinylcyclotetrasiloxane, and 1,3,5,7-tetramethyl-1,3,5,7-tetrahexenylcyclotetrasiloxane; triazoles such as benzotriazole; phosphines; mercaptans; and hydrazines.

The content of component (H) is not critical, but is preferably in the range of 0.01 to 5 mass % based on a mass of the composition, preferably from 0.01 to 3 mass based on a mass of the composition. This is because when the content of component (H) is greater than or equal to the lower limit of the range described above, the composition may have good storage stability, and when the content is less than or equal to the upper limit of the range described above, the composition may form a pressure sensitive adhesive layer on a substrate film under low temperature.

The silicone composition of the present invention may contain an organic solvent in order to increase its coating property. The organic solvent can be exemplified by benzene, toluene, xylene, or similar aromatic hydrocarbons; hexane, cyclohexane, heptane, octane, or similar aliphatic hydrocarbons; acetate, methylethylketone, methylisobutylketone, or similar ketones; dimethylether, diethylether, tetrahydrofuran, or similar ethers; butyl formate, methyl acetate, ethyl acetate, butyl acetate, ethyl propionate, Cellosolve acetate, or similar esters. Preferable are the aromatic hydrocarbons, especially, toluene and xylene.

The content of the organic solvent is not critical, but is preferably in an amount such that nonvolatile content in its solution is from 10 to 80 mass %, or from 20 to 70 mass %.

The silicone composition of the present invention is prepared by mixing aforementioned components (A) to (F), if necessary, with the addition of other arbitrary component. After the obtained silicone composition is applied onto a substrate film, it is cured at room temperature or with heating to form a pressure sensitive adhesive layer on the surface of the substrate film. The composition can be applied by gravure coat, micro-gravure coat, offset coat, offset gravure, roll coat, reverse-roll coat, air-knife coat, curtain coat, comma coat, etc.

Next, the pressure sensitive adhesive film of the present invention will be explained in detail.

The pressure sensitive adhesive film of the present invention comprises: a substrate film and a pressure sensitive adhesive layer on a surface of the substrate film, said pressure sensitive adhesive layer being made from the aforementioned silicone composition on the surface of the substrate film. The substrate films may be stretched or non-stretched plastic film substrates made from resins such as polyimide, polyethylene, polypropylene, polystyrene, polyvinyl chloride, polycarbonate, polyethylene terephthalate, Nylon, polyether-ether ketone, polyphenylene sulfide, liquid-crystal polyarylate, polyether sulfone, polyether imide, etc. The substrate films may also be comprised of the film-like plastics coated with the aforementioned resins. When it is required to provide heat-resistant properties, it is recommended to form the substrate film from polyimide (PI), polyether-ether ketone (PEEK), polyethylene naphthalate (PEN), liquid-crystal polyarylene, polyamidoimide (PAI), polyether sulfine (PES), etc.

The pressure sensitive adhesive film of the invention is produced by applying the aforementioned silicone composition onto the surface of the substrate film, and then forming a pressure sensitive adhesive layer on the surface of the substrate film by curing the composition at room temperature or with heating. The composition can be applied by the same methods as mentioned above. Curing with heat is preferable. Heating should be carried out at a temperature above 50° C., preferably within the range of 80 to 200° C.

The pressure sensitive adhesive layer preferably has a thickness of from 5 μm to 10 mm, preferably from 5 μm to 5 mm, from 5 μm to 1 mm, from 5 μm to 500 μm, from 5 to 100 or from 5 μm to 50 This is because when the thickness is greater than or equal to the lower limit of the range described above, the pressure sensitive adhesive layer may exhibit good anti-scratch property, and when the thickness is less than or equal to the upper limit of the range described above, the pressure sensitive adhesive layer may exhibit proper adhesion.

The pressure sensitive adhesive layer preferably has a pencil hardness of not less than H as measured according to ASTM D3363. This is because when the pencil hardness is greater than or equal to H, the pressure sensitive adhesive layer may exhibit good anti-scratch property.

The pressure sensitive adhesive layer may preferably have a peel adhesion strength less than 50 gf/inch. This is because when the peel adhesion strength less than 50 g/inch, the pressure sensitive adhesive layer may have smooth peeled from a protective film.

The protective film can be exemplified by polyethylene films, polyethylene terephthalate films, polyethersulfone films, fluororesin films, and release paper.

EXAMPLES

The silicone composition and the pressure sensitive adhesive film of the present invention are described in detail in the following through Practical and Comparative Examples. Viscosities (mPa·s units) in the Examples are the value measured at 25° C. using a rotary viscometer. Other physical properties reported in the Examples are the values measured at 25° C. The properties of the pressure sensitive adhesive film were measured as follows.

[Adhesive Strength]

The silicone composition was applied to a micro-gravure coating in order to obtain a thickness of 25 μm on polyethylene terephthalate (PET) film with a thickness of 50 μm. Then, the silicon composition was heated at 150° C. for 2 minutes to obtain a pressure sensitive adhesive layer on the PET film. The adhesive strength was measured during peeling at 180° and a peel rate of 0.3 meter/minute.

[Wet-Out Performance]

When attaching a protective film, wet-out performance of the pressure sensitive adhesive layer was evaluated by the existence of voids or ease of disappearing of voids.

[Anti-Scratch Performance]

Anti-scratch performance of the pressure sensitive adhesive layer was evaluated by finger nail.

[Pencil Hardness]

A pencil hardness of a surface of the pressure sensitive adhesive layer was measured by pencil tester according to ASTM D3363.

Practical Example 1

A silicone composition was prepared by mixing the following to homogeneity:

78.36 mass % of a dimethylvinylsiloxy-endblocked dimethylpolysiloxane with a viscosity of 38,000 mPa·s and a vinyl content of 0.09 mass %;

2.00 mass % of a raw rubber like-diorganopolysiloxane with a viscosity of more than 1,000,000 mPa·s and a vinyl content of 0.01 mass %;

15.00 mass % of a mixture of 35 mass % of xylene and 65 mass % of an organopolysiloxane resin represented by the following average unit formula:

$\{(CH_3)_3SiO_{1/2}\}_{0.65}(SiO_{4/2})_{1.0};$ 1.00 mass % of an anchorage additive with a vinyl content of 8.18 mass % and comprising a mixture of 3-glycidoxypropyl trimethoxysilane and silanol-endblocked dimethysiloxane-methylvinylsiloxane oligomer;

1.50 mass % of fumed silica powder with surface-treated with dimethyldichlorosilane and having a BET specific surface area of 200 m²/g;

1.00 mass % of a trimethylsiloxy-endblocked methylhydrogenpolysiloxane with a viscosity of 20 mPa·s and a silicon-bonded hydrogen content of 1.50 mass % (this addition gave 2.81 moles silicon-bonded hydrogen atoms in this methylhydrogenpolysiloxane per 1 mole vinyl in the composition);

1.00 mass % of platinum-1,3-divinyl-1,1,3,3-tetramethyldisiloxane complex; and 0.14 mass % of ethynylcyclohexan-1-ol.

The silicone composition was dissolved in toluene so that it might become 40 mass % of concentration, and then applied to a micro-gravure coater. The pressure sensitive adhesive film and pressure sensitive adhesive layer were evaluated as described above and their properties were reported in Table 1.

Practical Example 2

A silicone composition was prepared by mixing the following to homogeneity:

74.35 mass % of a dimethylvinylsiloxy-endblocked dimethylpolysiloxane with a viscosity of 38,000 mPa·s and a vinyl content of 0.09 mass %;
6.00 mass % of a raw rubber like-diorganopolysiloxane with a viscosity of more than 1,000,000 mPa·s and a vinyl content of 0.07 mass %;
15.00 mass % of a mixture of 35 mass % of xylene and 65 mass % of an organopolysiloxane resin represented by the following average unit formula:

{(CH$_3$)$_3$SiO$_{1/2}$}$_{0.65}$(SiO$_{4/2}$)$_{1.0}$;

1.00 mass % of an anchorage additive with a vinyl content of 8.18 mass % and comprising a mixture of 3-glycidoxypropyl trimethoxysilane and silanol-endblocked dimethysiloxane-methylvinylsiloxane oligomer;
1.50 mass % of fumed silica powder with surface-treated with dimethyldichlorosilane and having a BET specific surface area of 200 m$^2$/g;
1.00 mass % of a trimethylsiloxy-endblocked methylhydrogenpolysiloxane with a viscosity of 20 mPa·s and a silicon-bonded hydrogen content of 1.50 mass % (this addition gave 2.58 moles silicon-bonded hydrogen atoms in this methylhydrogenpolysiloxane per 1 mole vinyl in the composition);
1.00 mass % of platinum-1,3-divinyl-1,1,3,3-tetramethyldisiloxane complex; and
0.15 mass % of ethynylcyclohexan-1-ol.

The silicone composition was dissolved in toluene so that it might become 40 mass % of concentration, and then applied to a micro-gravure coater. The pressure sensitive adhesive film and pressure sensitive adhesive layer were evaluated as described above and their properties were reported in Table 1.

Comparative Example 1

A silicone composition was prepared by mixing the following to homogeneity:
47.00 mass % of a dimethylvinylsiloxy-endblocked dimethylpolysiloxane with a viscosity of 2,000 mPa·s and a vinyl content of 0.23 mass %;
27.00 mass % of a raw rubber like-diorganopolysiloxane with a viscosity of more than 1,000,000 mPa·s and a vinyl content of 0.01 mass %;
23.00 mass % of a mixture of 35 mass % of xylene and 65 mass % of an organopolysiloxane resin represented by the following average unit formula:

{(CH$_3$)$_3$SiO$_{1/2}$}$_{0.65}$(SiO$_{4/2}$)$_{1.0}$;

1.00 mass % of an anchorage additive with a vinyl content of 8.18 mass % and comprising a mixture of 3-glycidoxypropyl trimethoxysilane and silanol-endblocked dimethysiloxane-methylvinylsiloxane oligomer;
1.50 mass % of fumed silica powder with surface-treated with dimethyldichlorosilane and having a BET specific surface area of 200 m$^2$/g;
0.98 mass % of a trimethylsiloxy-endblocked methylhydrogenpolysiloxane with a viscosity of 20 mPa·s and a silicon-bonded hydrogen content of 1.50 mass % (this addition gave 2.00 moles silicon-bonded hydrogen atoms in this methylhydrogenpolysiloxane per 1 mole vinyl in the composition);
1.00 mass % of platinum-1,3-divinyl-1,1,3,3-tetramethyldisiloxane complex; and
0.15 mass % of ethynylcyclohexan-1-ol.

The silicone composition was dissolved in toluene so that it might become 40 mass % of concentration, and then applied to a micro-gravure coater. The pressure sensitive adhesive film and pressure sensitive adhesive layer were evaluated as described above and their properties were reported in Table 1.

TABLE 1

|  | Practical Example 1 | Practical Example 2 | Comparative Example 1 |
|---|---|---|---|
| Viscosity of 40 mass % toluene solution (mPa · s) | 420 | 560 | 606 |
| Adhesion (gf/inch) | 14 | 16 | 29.1 |
| Anti-scratch perfomance | Good | Good | Poor |
| Wet-out performance | Good | Good | Good |
| Pencil Hardness | 2H | 2H | <B |

INDUSTRIAL APPLICABILITY

Since the silicone composition of the present invention can form a pressure sensitive adhesive layer exhibiting proper adhesion and good anti-scratch property on a substrate film, it is suitable to form a pressure sensitive adhesive by means of a micro-gravure coating.

The invention claimed is:
1. A silicone composition comprising:
(A) a diorganopolysiloxane having at least two alkenyl groups in a molecule and having a viscosity at 25° C. of from 10,000 to 1,000,000 mPa·s, in an amount of from 60 to 80 mass % based on the mass of the composition;
(B) a diorganopolysiloxane having at least one alkenyl group in a molecule, and being raw and rubber-like at 25° C. or having a viscosity at 25° C. of more than 1,000,000 mPa·s, in an amount of from greater than 0 to 10 mass % based on the mass of the composition;
(C) an organopolysiloxane resin represented by the following average unit formula:

(R$^1$$_3$SiO$_{1/2}$)$_x$(SiO$_{4/2}$)$_{1.0}$ wherein each R$^1$ represents a halogen-substituted or un-substituted monovalent hydrocarbon group free from an alkenyl group and x is a number from 0.5 to 1.0, in an amount of from 0.5 to 20 mass % based on the mass of the composition;
(D) an organohydrogenpolysiloxane having at least two silicon-bonded hydrogen atoms in a molecule, in a quantity that provides from 0.1 to 10 moles of the silicon-bonded hydrogen atoms in this component per 1 mole of the total alkenyl groups in the composition;
(E) silica fine powder in an amount of from 0.5 to 5 mass % based on the mass of the composition; and
(F) a hydrosilylation catalyst in a quantity that accelerates hydrosilylation of the composition.

2. The silicone composition of claim 1, further comprising (G) an anchorage additive, in an amount of from 0.1 to 5 mass % based on the mass of the composition.

3. The silicone composition of claim 1, further comprising (H) a reaction inhibitor, in an amount of from 0.1 to 5 mass % based on the mass of the composition.

4. The silicone composition of claim 1, further comprising (I) an organic solvent, in an amount such that nonvolatile content in its solution is from 10 to 80 mass % based on the mass of the composition.

5. A pressure sensitive adhesive film comprising a substrate film and a pressure sensitive adhesive layer on a surface of the substrate film, said pressure sensitive adhesive layer formed from a silicone composition comprising:

(A) a diorganopolysiloxane having at least two alkenyl groups in a molecule and having a viscosity at 25° C. of from 10,000 to 1,000,000 mPa·s, in an amount of from 60 to 80 mass % based on the mass of the composition;

(B) a diorganopolysiloxane having at least one alkenyl group in a molecule, and being raw and rubber-like at 25° C. or having a viscosity at 25° C. of more than 1,000,000 mPa·s, in an amount of from greater than 0 to 10 mass % based on the mass of the composition;

(C) an organopolysiloxane resin represented by the following average unit formula:

$$(R^1_3SiO_{1/2})_x(SiO_{4/2})_{1.0}$$

wherein each $R^1$ represents a halogen-substituted or unsubstituted monovalent hydrocarbon group free from an alkenyl group and x is a number from 0.5 to 1.0, in an amount of from 0.5 to 20 mass % based on the mass of the composition;

(D) an organohydrogenpolysiloxane having at least two silicon-bonded hydrogen atoms in a molecule, in a quantity that provides from 0.1 to 10 moles of the silicon-bonded hydrogen atoms in this component per 1 mole of the total alkenyl groups in the composition;

(E) silica fine powder in an amount of from 0.5 to 5 mass % based on the mass of the composition; and (F) a hydrosilylation catalyst in a quantity that accelerates hydrosilylation of the composition.

6. The pressure sensitive adhesive film of claim 5, wherein the substrate film is formed from polyimide (PI), polyether-ether ketone (PEEK), polyethylene naphthalate (PEN), liquid-crystal polyarylene, polyamidoimide (PAI), polyether sulfine (PES), or polyethylene terephthalate (PET).

7. The pressure sensitive adhesive film of claim 5, wherein the pressure sensitive adhesive layer has a thickness of from 5 μm to 10 mm.

8. The pressure sensitive adhesive film of claim 5, wherein the pressure sensitive adhesive layer has a pencil hardness of not less than H as measured according to ASTM D3363.

9. The silicone composition of claim 2, further comprising (H) a reaction inhibitor, in an amount of from 0.1 to 5 mass % based on the mass of the composition.

10. The silicone composition of claim 9, further comprising (I) an organic solvent, in an amount such that nonvolatile content in its solution is from 10 to 80 mass % based on the mass of the composition.

11. The pressure sensitive adhesive film of claim 5, wherein the silicone composition further comprises (G) an anchorage additive, in an amount of from 0.1 to 5 mass % based on the mass of the composition.

12. The pressure sensitive adhesive film of claim 11, wherein the silicone composition further comprises (H) a reaction inhibitor, in an amount of from 0.1 to 5 mass % based on the mass of the composition.

13. The pressure sensitive adhesive film of claim 12, wherein the silicone composition further comprises (I) an organic solvent, in an amount such that nonvolatile content in its solution is from 10 to 80 mass % based on the mass of the composition.

14. The pressure sensitive adhesive film of claim 5, wherein the silicone composition further comprises (H) a reaction inhibitor, in an amount of from 0.1 to 5 mass % based on the mass of the composition.

15. The pressure sensitive adhesive film of claim 5, wherein the silicone composition further comprises (I) an organic solvent, in an amount such that nonvolatile content in its solution is from 10 to 80 mass % based on the mass of the composition.

16. The silicone composition of claim 1, wherein the diorganopolysiloxane (B) is present in an amount of from 1 to 10 mass % based on the mass of the composition.

* * * * *